(12) United States Patent
Mueller et al.

(10) Patent No.: US 7,556,836 B2
(45) Date of Patent: Jul. 7, 2009

(54) HIGH PROTEIN SNACK PRODUCT

(75) Inventors: Izumi Mueller, Glen Carbon, IL (US); Mitch Kaestner, Fenton, MO (US); Susan D. Shivas, Brentwood, MO (US); Michael Finfrock, St. Louis, MO (US)

(73) Assignee: Solae, LLC, St. Louis, MO (US)

( * ) Notice: Subject to any disclaimer, the term of this patent is extended or adjusted under 35 U.S.C. 154(b) by 0 days.

(21) Appl. No.: 10/933,897

(22) Filed: Sep. 3, 2004

(65) Prior Publication Data

US 2006/0051492 A1    Mar. 9, 2006

(51) Int. Cl.
*A23L 1/20* (2006.01)

(52) U.S. Cl. .................... 426/656; 426/634; 426/89

(58) Field of Classification Search ............... 426/656, 426/634, 89
See application file for complete search history.

(56) References Cited

U.S. PATENT DOCUMENTS

| | | | |
|---|---|---|---|
| 3,329,474 A | 7/1967 | Harris et al. | |
| 3,375,052 A | 3/1968 | Kosanke et al. | |
| 3,428,743 A | 2/1969 | Hanlon | |
| 3,439,348 A | 4/1969 | Harris et al. | |
| 3,499,700 A | 3/1970 | Harris et al. | |
| 3,503,670 A | 3/1970 | Kosanke et al. | |
| 3,554,632 A | 1/1971 | Chitayat | |
| 3,940,495 A | 2/1976 | Flier | 426/104 |
| 3,947,227 A | 3/1976 | Granger et al. | |
| 4,012,116 A | 3/1977 | Yevick | |
| 4,103,034 A * | 7/1978 | Ronai et al. | 426/250 |
| 4,110,794 A | 8/1978 | Lester et al. | |
| 4,117,176 A | 9/1978 | Taylor et al. | 426/660 |
| 4,170,771 A | 10/1979 | Bly | |
| 4,205,093 A | 5/1980 | Blake | 426/333 |
| 4,212,892 A | 7/1980 | Chahine et al. | 426/289 |
| 4,303,711 A * | 12/1981 | Erk et al. | 428/34.8 |
| 4,305,969 A | 12/1981 | Munk | 426/580 |
| 4,385,806 A | 5/1983 | Fergason | |

(Continued)

FOREIGN PATENT DOCUMENTS

EP    0 732 669 A1    9/1996

(Continued)

OTHER PUBLICATIONS

Fumiaki Yamada and Yoichi Taira, "An LED backlight for color LCD," IBM Research, Tokyo Research Laboratory, 1623-14, Shimotsuruma, Yamato, Kanagawa-ken 242-8502, Japan, IDW'00, pp. 363-366.

(Continued)

*Primary Examiner*—Anthony Weier
(74) *Attorney, Agent, or Firm*—James L. Cordek; Holly M. Amjad

(57) ABSTRACT

Snack products and processes for their manufacture are shown. The snack products provide a high concentration of protein, particularly soy protein, while maintaining an acceptable taste and texture. Additionally, there is a significant inhibition of the growth of microorganisms in the high protein snack products due to the high protein snack products having a low water activity. The high protein snack products have a textured soy protein product and a fruit or savory flavor flavoring agent and a semi-chewy or crisp texture.

12 Claims, 1 Drawing Sheet

U.S. PATENT DOCUMENTS

| | | | |
|---|---|---|---|
| 4,410,238 A | 10/1983 | Hanson | |
| 4,441,791 A | 4/1984 | Hornbeck | |
| 4,516,837 A | 5/1985 | Soref et al. | |
| 4,540,243 A | 9/1985 | Fergason | |
| 4,562,433 A | 12/1985 | Biferno | |
| 4,567,055 A | 1/1986 | Moore | 426/578 |
| 4,574,364 A | 3/1986 | Tabata et al. | |
| H70 H * | 6/1986 | Berkowitz et al. | 426/385 |
| 4,611,889 A | 9/1986 | Buzak | |
| 4,648,691 A | 3/1987 | Oguchi et al. | |
| 4,649,425 A | 3/1987 | Pund | |
| 4,654,222 A | 3/1987 | Fuller, Jr. | 426/640 |
| 4,673,578 A | 6/1987 | Becker et al. | 426/93 |
| 4,680,191 A | 7/1987 | Budd et al. | 426/439 |
| 4,681,770 A | 7/1987 | Palmer | 426/615 |
| 4,682,270 A | 7/1987 | Whitehead et al. | |
| RE32,521 E | 10/1987 | Fergason | |
| 4,711,786 A | 12/1987 | Schmidt | 426/19 |
| 4,715,010 A | 12/1987 | Inoue et al. | |
| 4,719,507 A | 1/1988 | Bos | |
| 4,755,038 A | 7/1988 | Baker | |
| 4,758,818 A | 7/1988 | Vatne | |
| 4,766,430 A | 8/1988 | Gillette et al. | |
| 4,784,867 A | 11/1988 | LaBaw et al. | 426/309 |
| 4,832,962 A | 5/1989 | Oppenheimer et al. | 426/3 |
| 4,834,500 A | 5/1989 | Hilsum et al. | |
| 4,862,270 A | 8/1989 | Nishio | |
| 4,862,496 A | 8/1989 | Kelly et al. | |
| 4,885,783 A | 12/1989 | Whitehead et al. | |
| 4,888,187 A | 12/1989 | Given, Jr. et al. | 426/102 |
| 4,888,690 A | 12/1989 | Huber | |
| 4,910,038 A | 3/1990 | Ducharme | 426/641 |
| 4,910,413 A | 3/1990 | Tamune | |
| 4,917,452 A | 4/1990 | Liebowitz | |
| 4,933,754 A | 6/1990 | Reed et al. | |
| 4,954,789 A | 9/1990 | Sampsell | |
| 4,958,915 A | 9/1990 | Okada et al. | |
| 4,969,717 A | 11/1990 | Mallinsoh | |
| 4,981,838 A | 1/1991 | Whitehead | |
| 4,991,924 A | 2/1991 | Shankar et al. | |
| 5,012,274 A | 4/1991 | Dolgoff | |
| 5,013,140 A | 5/1991 | Healey et al. | |
| 5,074,647 A | 12/1991 | Fergason et al. | |
| 5,075,789 A | 12/1991 | Jones et al. | |
| 5,083,199 A | 1/1992 | Borner | |
| 5,122,791 A | 6/1992 | Gibbons et al. | |
| 5,128,782 A | 7/1992 | Wood | |
| 5,138,449 A | 8/1992 | Kerpchar | |
| 5,144,292 A | 9/1992 | Shiraishi et al. | |
| 5,164,829 A | 11/1992 | Wada | |
| 5,168,183 A | 12/1992 | Whitehead | |
| 5,187,603 A | 2/1993 | Bos | |
| 5,188,861 A | 2/1993 | Mazin et al. | 426/640 |
| 5,202,897 A | 4/1993 | Whitehead | |
| 5,206,633 A | 4/1993 | Zalph | |
| 5,214,758 A | 5/1993 | Ohba et al. | |
| 5,222,209 A | 6/1993 | Murata et al. | |
| 5,247,366 A | 9/1993 | Ginosar et al. | |
| 5,256,676 A | 10/1993 | Hider et al. | |
| 5,264,238 A | 11/1993 | Taga et al. | 426/640 |
| 5,290,584 A | 3/1994 | Ray | 426/637 |
| 5,296,247 A | 3/1994 | Huang et al. | 426/283 |
| 5,296,253 A | 3/1994 | Lusas et al. | 426/629 |
| 5,300,312 A | 4/1994 | Lusas et al. | 426/634 |
| 5,300,942 A | 4/1994 | Dolgoff | |
| 5,305,146 A | 4/1994 | Nakagaki et al. | |
| 5,311,217 A | 5/1994 | Guerin et al. | |
| 5,313,225 A | 5/1994 | Miyadera | |
| 5,313,454 A | 5/1994 | Bustini et al. | |
| 5,317,400 A | 5/1994 | Gurley et al. | |
| 5,320,859 A | 6/1994 | Namdari | 426/551 |
| 5,339,382 A | 8/1994 | Whitehead | |
| 5,357,369 A | 10/1994 | Pilling et al. | |
| 5,359,345 A | 10/1994 | Hunter | |
| 5,369,266 A | 11/1994 | Nohda et al. | |
| 5,386,253 A | 1/1995 | Fielding | |
| 5,394,195 A | 2/1995 | Herman | |
| 5,395,755 A | 3/1995 | Thorpe et al. | |
| 5,416,496 A | 5/1995 | Wood | |
| 5,422,680 A | 6/1995 | Lagoni et al. | |
| 5,426,312 A | 6/1995 | Whitehead | |
| 5,436,755 A | 7/1995 | Gueria | |
| 5,450,498 A | 9/1995 | Whitehead | |
| 5,455,053 A | 10/1995 | Zimmermann et al. | 426/106 |
| 5,461,397 A | 10/1995 | Zhang et al. | |
| 5,471,225 A | 11/1995 | Parks | |
| 5,471,228 A | 11/1995 | Ilcisin et al. | |
| 5,477,274 A | 12/1995 | Akiyoshi | |
| 5,481,637 A | 1/1996 | Whitehead | |
| 5,570,210 A | 10/1996 | Yoshida et al. | |
| 5,579,134 A | 11/1996 | Lengyel | |
| 5,580,791 A | 12/1996 | Thorpe et al. | |
| 5,592,193 A | 1/1997 | Chen | |
| 5,601,864 A | 2/1997 | Mitchell | 426/643 |
| 5,617,112 A | 4/1997 | Yoshida et al. | |
| 5,642,015 A | 6/1997 | Whitehead et al. | |
| 5,642,128 A | 6/1997 | Inoue | |
| D381,355 S | 7/1997 | Frank-Braun | |
| 5,650,880 A | 7/1997 | Shuter et al. | |
| 5,652,672 A | 7/1997 | Huignard et al. | |
| 5,661,839 A | 8/1997 | Whitehead | |
| 5,682,075 A | 10/1997 | Bolleman et al. | |
| 5,684,354 A | 11/1997 | Gleckman | |
| 5,689,283 A | 11/1997 | Shirochi | |
| 5,715,347 A | 2/1998 | Whitehead | |
| 5,717,422 A | 2/1998 | Fergason | |
| 5,729,242 A | 3/1998 | Margerum et al. | |
| 5,754,159 A | 5/1998 | Wood et al. | |
| 5,759,599 A | 6/1998 | Wampler et al. | 426/89 |
| 5,767,837 A | 6/1998 | Hara | |
| 5,773,070 A | 6/1998 | Kazemzadeh | 426/573 |
| 5,784,181 A | 7/1998 | Loiseaux et al. | |
| 5,796,382 A | 8/1998 | Beeteson | |
| 5,854,662 A | 12/1998 | Yuyama et al. | |
| 5,886,681 A | 3/1999 | Walsh et al. | |
| 5,889,567 A | 3/1999 | Swanson et al. | |
| 5,892,325 A | 4/1999 | Gleckman | |
| 5,901,266 A | 5/1999 | Whitehead | |
| 5,939,830 A | 8/1999 | Praiswater | |
| 5,940,057 A | 8/1999 | Lien et al. | |
| 5,959,777 A | 9/1999 | Whitehead | |
| 5,969,704 A | 10/1999 | Green et al. | |
| 5,978,142 A | 11/1999 | Blackham et al. | |
| 5,986,628 A | 11/1999 | Tuenge et al. | |
| 5,995,070 A | 11/1999 | Kitada | |
| 5,999,307 A | 12/1999 | Whitehead et al. | |
| 6,008,929 A | 12/1999 | Akimoto et al. | |
| 6,024,462 A | 2/2000 | Whitehead | |
| 6,025,583 A | 2/2000 | Whitehead | |
| 6,027,758 A | 2/2000 | McHugh et al. | 426/615 |
| 6,043,591 A | 3/2000 | Gleckman | |
| 6,050,704 A | 4/2000 | Park | |
| 6,064,784 A | 5/2000 | Whitehead et al. | |
| 6,079,844 A | 6/2000 | Whitehead et al. | |
| 6,110,511 A | 8/2000 | Rollins et al. | 426/94 |
| 6,111,559 A | 8/2000 | Motomura et al. | |
| 6,111,622 A | 8/2000 | Abileah | |
| 6,120,588 A | 9/2000 | Jacobson | |
| 6,120,839 A | 9/2000 | Comiskey et al. | |
| 6,129,444 A | 10/2000 | Tognoni | |
| 6,160,595 A | 12/2000 | Kishimoto | |
| 6,172,798 B1 | 1/2001 | Albert et al. | |
| 6,211,851 B1 | 4/2001 | Lien et al. | |
| 6,215,920 B1 | 4/2001 | Whitehead et al. | |

| | | |
|---|---|---|
| 6,243,068 B1 | 6/2001 | Evanicky et al. |
| 6,267,850 B1 | 7/2001 | Bailey et al. |
| 6,268,843 B1 | 7/2001 | Arakawa |
| 6,276,801 B1 | 8/2001 | Fielding |
| 6,300,931 B1 | 10/2001 | Someya et al. |
| 6,300,932 B1 | 10/2001 | Albert |
| 6,304,365 B1 | 10/2001 | Whitehead |
| 6,323,455 B1 | 11/2001 | Bailey et al. |
| 6,323,989 B1 | 11/2001 | Jacobsen et al. |
| 6,327,072 B1 | 12/2001 | Comiskey et al. |
| RE37,594 E | 3/2002 | Whitehead |
| 6,359,662 B1 | 3/2002 | Walker |
| 6,377,383 B1 | 4/2002 | Whitehead et al. |
| 6,384,979 B1 | 5/2002 | Whitehead et al. |
| 6,414,664 B1 | 7/2002 | Conover et al. |
| 6,418,253 B2 | 7/2002 | Whitehead |
| 6,428,189 B1 | 8/2002 | Hochstein |
| 6,437,921 B1 | 8/2002 | Whitehead |
| 6,439,731 B1 | 8/2002 | Johnson et al. |
| 6,448,944 B2 | 9/2002 | Ronzani et al. |
| 6,448,951 B1 | 9/2002 | Sakaguchi et al. |
| 6,448,955 B1 | 9/2002 | Evanicky et al. |
| 6,452,734 B1 | 9/2002 | Whitehead et al. |
| 6,461,634 B1 * | 10/2002 | Marshall ................ 424/439 |
| 6,483,643 B1 | 11/2002 | Zuchowski |
| 6,507,327 B1 | 1/2003 | Atherton et al. |
| 6,545,677 B2 | 4/2003 | Brown |
| 6,559,827 B1 | 5/2003 | Mangerson |
| 6,573,928 B1 | 6/2003 | Jones et al. |
| 6,574,025 B2 | 6/2003 | Whitehead et al. |
| 6,576,253 B2 * | 6/2003 | Manning et al. ............ 424/439 |
| 6,590,561 B1 | 7/2003 | Kabel et al. |
| 6,597,339 B1 | 7/2003 | Ogawa |
| 6,599,556 B2 | 7/2003 | Stark et al. ................. 426/656 |
| 6,657,607 B1 | 12/2003 | Evanicky et al. |
| 6,680,834 B2 | 1/2004 | Williams |
| 6,690,383 B1 | 2/2004 | Braudaway et al. |
| 6,697,110 B1 | 2/2004 | Jaspers et al. |
| 6,700,559 B1 | 3/2004 | Tanaka et al. |
| 6,753,876 B2 | 6/2004 | Brooksby et al. |
| 6,791,520 B2 | 9/2004 | Choi |
| 6,803,901 B1 | 10/2004 | Numao |
| 6,816,141 B1 | 11/2004 | Fergason |
| 6,828,816 B2 | 12/2004 | Ham |
| 6,856,449 B2 | 2/2005 | Winkler et al. |
| 6,864,916 B1 | 3/2005 | Nayar et al. |
| 6,885,369 B2 | 4/2005 | Tanahashi et al. |
| 6,891,672 B2 | 5/2005 | Whitehead et al. |
| 6,900,796 B2 | 5/2005 | Yasunishi et al. |
| 2001/0013854 A1 | 8/2001 | Ogoro |
| 2001/0024199 A1 | 9/2001 | Hughes et al. |
| 2001/0035853 A1 | 11/2001 | Hoelen et al. |
| 2001/0038736 A1 | 11/2001 | Whitehead |
| 2001/0048407 A1 | 12/2001 | Yasunishi et al. |
| 2002/0003522 A1 | 1/2002 | Baba et al. |
| 2002/0012722 A1 | 1/2002 | Prosise et al. .................. 426/72 |
| 2002/0015759 A1 | 2/2002 | Prosise et al. .................. 426/72 |
| 2002/0033783 A1 | 3/2002 | Koyama |
| 2002/0034574 A1 | 3/2002 | Prosise et al. ................ 426/560 |
| 2002/0036650 A1 | 3/2002 | Kasahara et al. |
| 2002/0039619 A1 | 4/2002 | Monagle ................ 426/634 |
| 2002/0057253 A1 | 5/2002 | Lim et al. |
| 2002/0063963 A1 | 5/2002 | Whitehead et al. |
| 2002/0067325 A1 | 6/2002 | Choi |
| 2002/0094359 A1 | 7/2002 | Prosise et al. .................. 426/72 |
| 2002/0105709 A1 | 8/2002 | Whitehead et al. |
| 2002/0114877 A1 | 8/2002 | Stark et al. ................. 426/656 |
| 2002/0135553 A1 | 9/2002 | Nagai et al. |
| 2002/0149574 A1 | 10/2002 | Johnson et al. |
| 2002/0154088 A1 | 10/2002 | Nishimura |
| 2002/0159002 A1 | 10/2002 | Chang |
| 2002/0159692 A1 | 10/2002 | Whitehead |
| 2002/0162256 A1 | 11/2002 | Wardle et al. |
| 2002/0171617 A1 | 11/2002 | Fuller |
| 2002/0175907 A1 | 11/2002 | Sekiya et al. |
| 2002/0197357 A1 | 12/2002 | Pfeiffer ..................... 426/103 |
| 2003/0048393 A1 | 3/2003 | Sayag |
| 2003/0054089 A1 | 3/2003 | Prosise et al. ............... 426/658 |
| 2003/0064145 A1 * | 4/2003 | Fannon ..................... 426/656 |
| 2003/0090455 A1 | 5/2003 | Daly |
| 2003/0104108 A1 | 6/2003 | Patel et al. .................. 426/598 |
| 2003/0107538 A1 | 6/2003 | Asao et al. |
| 2003/0113434 A1 * | 6/2003 | Marsland ................... 426/656 |
| 2003/0132905 A1 | 7/2003 | Lee et al. |
| 2003/0169247 A1 | 9/2003 | Kawabe et al. |
| 2004/0012551 A1 | 1/2004 | Ishii |
| 2004/0057017 A1 | 3/2004 | Childers et al. |
| 2004/0239587 A1 | 12/2004 | Murata et al. |
| 2004/0263450 A1 | 12/2004 | Lee et al. |
| 2005/0088403 A1 | 4/2005 | Yamazaki |
| 2005/0157298 A1 | 7/2005 | Evanicky et al. |
| 2005/0225561 A1 | 10/2005 | Higgins et al. |

FOREIGN PATENT DOCUMENTS

| | | |
|---|---|---|
| EP | 0 829 747 A1 | 3/1998 |
| EP | 0 606 162 B1 | 11/1998 |
| EP | 0912047 | 4/1999 |
| EP | 0 963 112 A1 | 12/1999 |
| EP | 1168243 | 1/2002 |
| EP | 1 202 244 A1 | 5/2002 |
| EP | 1 206 130 A1 | 5/2002 |
| EP | 1 313 066 A1 | 5/2003 |
| EP | 1 316 919 A2 | 6/2003 |
| EP | 1 340 428 A2 | 9/2003 |
| EP | 1 453 030 A1 | 9/2004 |
| FR | 2 611 389 | 2/1987 |
| JP | 361135561 * | 6/1986 |
| JP | 64-10299 | 1/1989 |
| JP | 1-98383 | 4/1989 |
| JP | 3-71111 | 3/1991 |
| JP | 3-198026 | 8/1991 |
| JP | 403240460 * | 10/1991 |
| JP | 5-66501 | 3/1993 |
| JP | 5-80716 | 4/1993 |
| JP | 5-273523 | 10/1993 |
| JP | 5-289044 | 11/1993 |
| JP | 6-247623 | 9/1994 |
| JP | 6-313018 | 11/1994 |
| JP | 7-121120 | 5/1995 |
| JP | 9-244548 | 9/1997 |
| JP | 10-508120 | 8/1998 |
| JP | 11-052412 | 2/1999 |
| JP | 2002-099250 | 4/2000 |
| JP | 2000-206488 | 7/2000 |
| JP | 2000-275995 | 10/2000 |
| JP | 2000-321571 | 11/2000 |
| JP | 2002-091385 | 3/2002 |
| JP | 2003-204450 | 7/2003 |
| JP | 2003-230010 | 8/2003 |
| JP | 3523170 | 2/2004 |
| WO | WO 91/15843 | 10/1991 |
| WO | WO 96/336483 | 10/1996 |
| WO | 97/07684 | 3/1997 |
| WO | WO 98/08134 | 2/1998 |
| WO | 98/54984 | 12/1998 |
| WO | WO 00/75720 | 12/2000 |
| WO | WO 01/69584 | 9/2001 |
| WO | WO 02/03687 | 1/2002 |
| WO | 02/15712 A2 | 2/2002 |
| WO | 02/071857 A1 | 9/2002 |
| WO | WO 02/079862 | 10/2002 |
| WO | WO 03/077013 | 9/2003 |

| | | |
|---|---|---|
| WO | WO 2004/013835 | 2/2004 |

OTHER PUBLICATIONS

A.A.S. Sluyterman and E.P. Boonekamp, "18.2: Architectural Choices in a Scanning Backlight for Large LCD TVs," Philips Lighting, Bld. HBX-p, PO Box 80020, 5600 JM Eindhoven, The Netherlands, SID 05 Digest, pp. 996-999.

Fumiaki Yamada, Hajime Nakamura, Yoshitami Sakaguchi, and Yoichi Taira, "52.2: Invited Paper: Color Sequential LCD Based on OCB with an LED Backlight," Tokyo Research Laboratory, IBM Research, Yamato, Kanagawa, Japan, SID 00 Digest, pp. 1180-1183.

Ngai-Man Cheung, et al., "Configurable entropy coding scheme for H.26L," ITU-Telecommunications Standardization Sector, Study Group 16 Question 6 Video Coding Experts Group (VCEG), Twelfth Meeting: Eibsee, Germany, Jan. 9-12, 2001, pp. 1-11.

T. Funamoto, T. Kobayashi, T. Murao, "High-Picture-Quality Technique for LCD televisions: LCD-AI," AVC Products Development Center, Matsushita Electric Industrial, Co., Ltd., 1-1 Matsushita-cho, Ibaraki, Osaka 567-0026 Japan, 2 pages, date unknown.

Steven L. Wright, et al., "Measurement and Digital compensation of Crosstalk and Photoleakage in High-Resolution TFTLCDs," IBM T.J. Watson Research Center, PO Box 218 MS 10-212, Yorktown Heights, NY 10598, pp. 1-12, date unknown.

\* cited by examiner

HIGH PROTEIN SNACK PRODUCT

BACKGROUND OF THE INVENTION

The present invention generally relates to snack products comprising a high concentration of soy protein and processes for making such high protein snack products. More particularly, the present invention relates to semi-chewy or crisp high soy protein-containing snack products having a fruity or savory flavor.

In recent years, it has become common for consumers to choose foods that are convenient and tasty. However, convenient or ready-to-eat foods tend to be nutritionally unbalanced as they are high in fat and carbohydrates, and low in dietary fiber and protein. In particular, it is appreciated that the high fat and calorie load and low dietary fiber level of these convenient foods can contribute to obesity and various chronic diseases, such as coronary heart disease, stroke, diabetes, and certain types of cancer.

In response to the results of recent research showing the possible negative effects of particular foods, consumers are becoming more health conscious and monitoring their food intake. In particular, since animal products, like red meats, are the only main dietary source of cholesterol and may contain high levels of saturated fats, health professionals have recommended that consumers significantly reduce their intake of red meats. As a substitute, many consumers are choosing fish and poultry, but vegetable products, such as vegetable proteins, are also growing in popularity.

Generally, vegetable protein is eaten in the form of beans or other natural products, but enriched sources such as flour, concentrates, and isolates of defatted oilseed, especially soy, have been developed for use as food ingredients.

Texturized vegetable protein products for use in food are known in the art and are typically prepared by heating a mixture of protein material along with water under mechanical pressure in a cooker extruder and extruding the mixture through a die. Upon extrusion, the extrudate generally expands to form a fibrous cellular structure as it enters a medium of reduced pressure (usually atmospheric). Expansion of the extrudate results from inclusion of soluble carbohydrates, which reduce the gel strength of the mixture. The extrudates are then used to form other products such as vegetable meat analogs. Extrusion methods for forming textured protein meat analogs are well known and disclosed, for example, in U.S. Pat. No. 4,099,455.

Soy protein products can be good substitutes for animal products because, unlike some other beans, soy offers a "complete" protein profile. Soybeans contain all the amino acids essential to human nutrition, which must be supplied in the diet because they cannot be synthesized by the human body. Additionally, soybeans have the highest protein content of all cereals and legumes with around 40% protein. Soybeans also contain about 20% oil and the remaining dry matter is mostly carbohydrate (35%). Typically, soybeans contain about 35% (by weight) protein, 17% (by weight) oil, 31% (by weight) carbohydrates, and 4.4% (by weight) ash.

Suitable soy protein products include soy flakes, soy flour, soy grits, soy meal, soy protein concentrates, soy protein isolates, and mixtures thereof. The primary difference between these soy protein materials is the degree of refinement relative to whole soybeans.

Soy flakes are generally produced by dehulling, defatting, and grinding the soybean and typically contain less than 65% (by weight) soy protein on a moisture-free basis. Soy flakes also contain soluble carbohydrates, insoluble carbohydrates such as soy fiber, and fat inherent in soy. Soy flakes may be defatted, for example, by extraction with hexane. Soy flours, soy grits, and soy meals are produced from soy flakes by comminuting the flakes in grinding and milling equipment such as a hammer mill or an air jet mill to a desired particle size. The comminuted materials are typically heat treated with dry heat or steamed with moist heat to "toast" the ground flakes and inactivate anti-nutritional elements present in soy such as Bowman-Birk and Kunitz trypsin inhibitors. Heat treating the ground flakes in the presence of significant amounts of water is avoided to prevent denaturation of the soy protein in the material and to avoid costs involved in the addition and removal of water from the soy material. The resulting ground, heat treated material is a soy flour, soy grit, or a soy meal, depending on the average particle size of the material. Soy flour generally has a particle size of less than about 150 μm. Soy grits generally have a particle size of about 150 to about 1000 μm. Soy meal generally has a particle size of greater than about 1000 μm.

Soy protein concentrates typically contain about 65% (by weight) to about 85% (by weight) soy protein, with the major non-protein component being fiber. Soy protein concentrates are typically formed from defatted soy flakes by washing the flakes with either an aqueous alcohol solution or an acidic aqueous solution to remove the soluble carbohydrates from the protein and fiber. On a commercial scale, considerable costs are incurred with the handling and disposing of the resulting waste stream.

Soy protein isolates, which are more highly refined soy protein materials, are processed to contain at least 90% (by weight) soy protein on a moisture free basis and little or no soluble carbohydrates or fiber. Soy protein isolates are typically formed by extracting soy protein and water soluble carbohydrates from defatted soy flakes or soy flour with an alkaline aqueous extractant. The aqueous extract, along with the soluble protein and soluble carbohydrates, is separated from materials that are insoluble in the extract, mainly fiber. The extract is typically then treated with an acid to adjust the pH of the extract to the isoelectric point of the protein to precipitate the protein from the extract. The precipitated protein is separated from the extract, which retains the soluble carbohydrates, and is dried after being adjusted to a neutral pH or is dried without any pH adjustment.

It is well known that these vegetable products, such as soy protein products, contain no cholesterol. For decades, nutritional studies have indicated that the inclusion of soy protein in the diet actually reduces serum cholesterol levels in people who are at risk. Further, the higher the cholesterol level, the more effective soy proteins are in lowering that level.

Despite all of the above advantages, it is well known that by supplementing foods with increased levels of dietary fiber and protein, taste can be seriously compromised. More particularly, protein sources, such as soy flour, can produce objectionable off-flavors in the finished products. For example, many consumers complain that high protein foods, like those supplemented with soy protein, taste chalky and bland.

In addition to the challenges associated with improving taste, it is known that increasing a food's protein level typically results in the loss of the desirable product texture that consumers expect. This is especially true for snack foods. The loss of desirable texture typically results in products, such as high protein and fiber health bar snacks, that are described by consumers as having an unpleasant stickiness, grittiness, or dryness. Instead of improving texture, current attempts to solve textural problems merely hide unpleasant textural characteristics. Attempted solutions include coating products with materials that are high in fat. Unfortunately, these "fixes"

are only temporary, as shortly after the initial bite or product breakdown, the true nature of the product's texture becomes apparent. While the loss of textural quality is appreciated by those skilled in the art, the complex interactions that give rise to poor textures are little understood.

Additionally, there is a problem with long-term storage of these protein-enriched foods due to the growth of microorganisms. The growth of microorganisms, especially bacteria, is closely associated with the water activity level, or availability of free water, of a food product. When a bacterial cell is placed in a solution with low water activity, the cell dehydrates and bacterial growth is inhibited. According to the principles of thermodynamics, water activity is the driving force behind dehydration. Furthermore, yeasts and molds tend to be extremely resistant to water activity. They are particularly effective in obtaining water even under lower water activity conditions than bacteria.

As is evident from the foregoing, a need exists in the industry for a convenient, ready-to-eat food product that provides a high concentration of protein and has an acceptable taste and texture. Additionally, it would be beneficial if the food product could significantly reduce the growth of microorganisms so that the product is shelf stable and can be stored for prolonged periods of time for retail sale.

SUMMARY OF THE INVENTION

In one embodiment, the present invention provides a high protein snack product having a fruity flavor and a semi-chewy texture. In another embodiment, the present invention provides a high protein snack product having a savory flavor and a crisp texture. These high protein snack products have a low water activity and thus are shelf stable. The present invention also provides processes for preparing the high protein snack products.

As such, the present invention is directed to a high protein snack product. The high protein snack product comprises at least 45% (by weight) of a textured soy protein product and a fruity flavor flavoring agent. The textured soy protein product comprises at least 66% (by weight) protein.

The present invention is further directed to a high protein snack product. The high protein snack product comprises at least 35% (by weight) of a textured soy protein product and a savory flavor flavoring agent. The textured soy protein product comprises at least 66% (by weight) protein.

The present invention is further directed to a high protein snack product. The high protein snack product comprises at least 45% (by weight) of a textured soy protein product and a fruit flavor flavoring agent. The textured soy protein product comprises at least 66% (by weight) protein. The high protein snack product is prepared by crust freezing and slicing a formulation. The formulation comprises a fruit flavor flavoring agent, a sweetener, a binding agent, water, and a hydrated textured soy protein product.

The present invention is further directed to a high protein snack product. The high protein snack product comprises at least 35% (by weight) of a textured soy protein product and a savory flavor flavoring agent. The textured soy protein product comprises at least 66% (by weight) protein. The high protein snack product is prepared by crust freezing and slicing a formulation. The formulation comprises a savory flavor flavoring agent, a binding agent, water, and a hydrated textured soy protein product.

The present invention is further directed to a process for preparing a high protein snack product. The process comprises: hydrating a textured soy protein product by contacting the textured soy protein product with a hydrating solution, wherein the textured soy protein product comprises at least 66% (by weight) protein, and wherein the hydrating solution comprises water and a fruit flavor flavoring agent, shredding the hydrated textured soy protein product, mixing the shredded hydrated textured soy protein product with a solution to form a cohesive product mixture, wherein the solution comprises a binding agent and water, freezing the cohesive product mixture, dividing the frozen cohesive product mixture into a plurality of individual wafers, and drying the individual wafers such that the wafers have a water activity of less than about 0.85.

The present invention is further directed to a process for preparing a high protein snack product. The process comprises: hydrating a textured soy protein product by contacting the textured soy protein product with water, wherein the textured soy protein product comprises at least 66% (by weight) protein, shredding the hydrated textured soy protein product, introducing a savory flavor flavoring agent into the shredded hydrated textured soy protein product, mixing the shredded hydrated textured soy protein product with a solution to form a cohesive product mixture, wherein the solution comprises a binding agent and water, freezing the cohesive product mixture, dividing the frozen cohesive product mixture into a plurality of individual wafers, and drying the individual wafers such that the wafers have a water activity of less than 0.85.

Other features and advantages of this invention will be in part apparent and in part pointed out hereinafter.

DETAILED DESCRIPTION OF THE PREFERRED EMBODIMENTS

Figure 1:
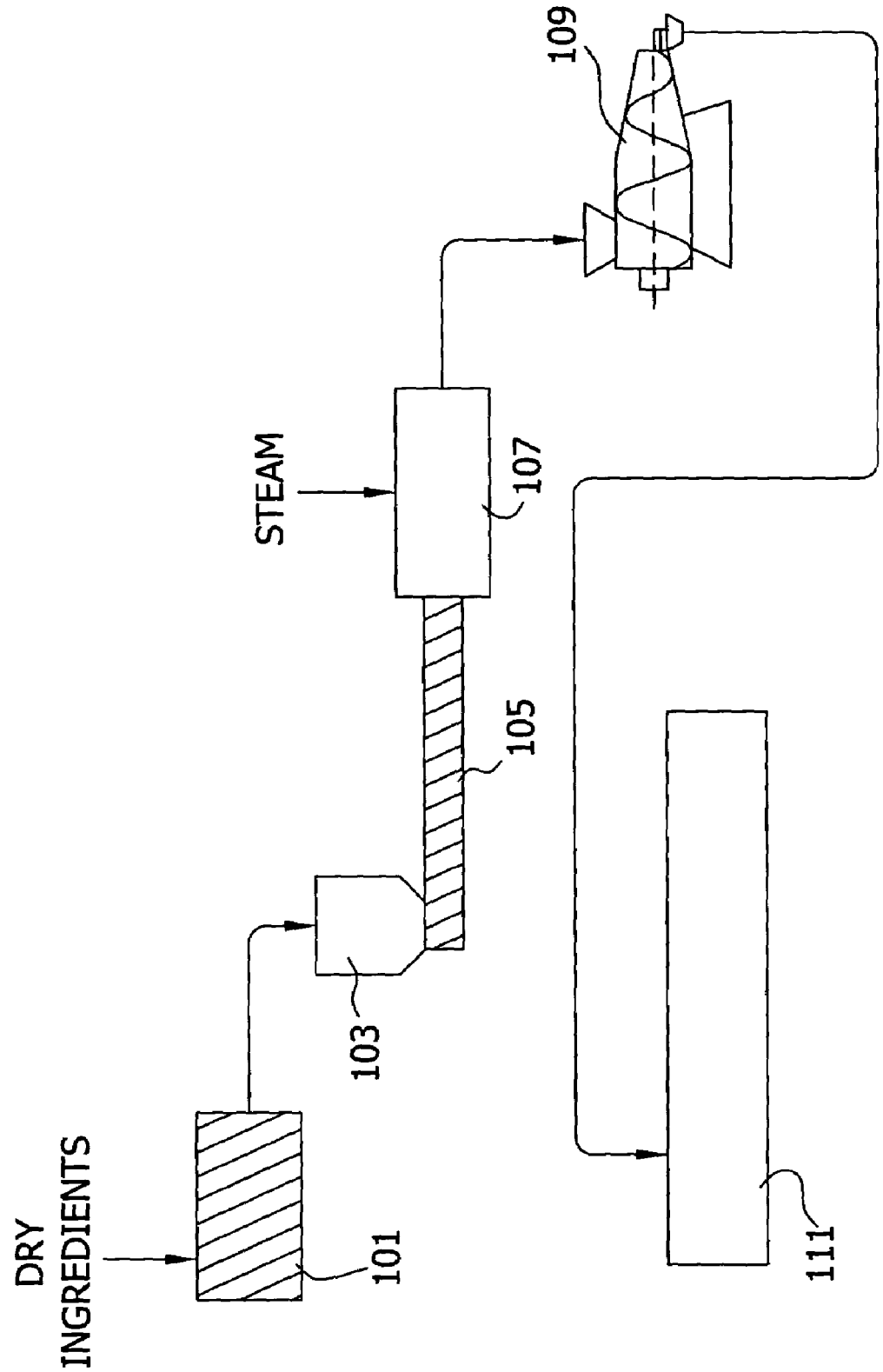
FIG. 1 is a schematic flow sheet of a process useful in preparing protein extrudates suitable for use in the present invention.

The present invention is generally directed to high protein snack products and processes for their manufacture. Specifically, the present invention relates to a high protein snack product comprising a textured soy protein product and a flavoring agent. The products comprise a high amount of soy protein and have a pleasant taste.

In one embodiment, the high protein snack product provides a high amount of protein, specifically a high amount of soy protein, while having an appealing fruity flavor and a semi-chewy texture. In another embodiment, the high protein snack product provides a high amount of protein, specifically a high amount of soy protein, while having an appealing savory flavor and a crisp texture. Additionally, the snack products described herein are shelf stable, as they have low water activity. As used herein, the term "snack product" means snack chips that have a chewy, semi-chewy, or crisp texture.

As noted above, in one embodiment the high protein snack products described herein comprise a textured soy protein product and a flavoring agent. The textured soy protein product generally comprises defatted soy flour, which is typically prepared by heating a mixture of soy protein containing material along with water under increasing temperature, pressure, and shear conditions in a cooker extruder, and extruding the mixture through a die. Upon extrusion, the extrudate generally expands to form a fibrous cellular structure as it enters a medium of reduced pressure (usually atmospheric). Extrusion methods for forming textured soy protein products are well known and disclosed, for example, in U.S. Pat. No. 4,099,455.

In one embodiment of an extrusion process suitable for preparing a textured soy protein product suitable for use in the products described herein, the soy protein containing material typically comprises a blend of soy protein isolates comprising at least 2 parts by weight of a hydrolyzed (i.e., generally low viscosity/low gelling) protein isolate per part by weight of an unhydrolyzed (i.e., generally high viscosity/high gelling) protein isolate.

Blends comprising a plurality of soy protein isolates, one of which is a low viscosity/low gelling source produced by partial hydrolysis of a soy protein isolate, typically comprise from about 60% to about 100% by weight of a hydrolyzed protein isolate on a moisture-free basis and from about 0% to about 33% by weight of an unhydrolyzed protein isolate on a moisture-free basis.

Suitable isolated soy protein sources exhibiting a low viscosity and/or low gelling (i.e., partially hydrolyzed) for use as a low viscosity/low gelling soy protein material include SUPRO 670 and SUPRO 710, available from The Solae Company (St. Louis, Mo.), and PROFAM 931 and PROFAM 873 available from Archer Daniels Midland (Decatur, Ill.). For both SUPRO 670 and SUPRO 710, the degree of hydrolysis can range from 0.5%-5.0%. The molecular weight distribution of each of these isolates can be determined by size exclusion chromatography.

Suitable sources of high viscosity and/or medium/high gelling isolated soy protein (i.e., unhydrolyzed) for use as the second soy protein isolate include SUPRO 620, SUPRO 500E, SUPRO 630, and SUPRO EX33 available from The Solae Company (St. Louis, Mo.); PROFAM 981 available from Archer Daniels Midland (Decatur, Ill.); and PROLISSE soy protein isolate available from Cargill Soy Protein Solutions, Inc. (Minneapolis, Minn.).

The soy protein containing material may also contain one or more soluble carbohydrate source in an amount of from about 0.001% to about 20% (by weight) soluble carbohydrates on a moisture-free basis. Suitable sources of soluble carbohydrates include, for example, cereals, tubers and roots such as rice (e.g., rice flour), wheat, corn, barley, potatoes (e.g., native potato starch), and tapioca (e.g., native tapioca starch).

In addition to soluble carbohydrates, the protein mixture may also contain insoluble carbohydrates such as soy fiber which does not contribute to nutritive carbohydrate load and which, generally, is present as an aid in processing of the mixture because the fiber serves to facilitate flowability and expansion of the protein mixture. When soy fiber is present in the mixture to serve either as filler to increase the volume of the mixture or as a processing aid, the amount of fiber present can vary widely. Generally, however, the protein mixture comprises from about 0.001% to about 5% (by weight) fiber. Soy fiber absorbs moisture as the extrusion mass flows through the extrusion barrel to the die. A modest concentration of soy fiber is believed to be effective in obstructing cross-linking of protein molecules, thus preventing excessive gel strength from developing in the cooked extrusion mass exiting the die. Unlike the protein, which also absorbs moisture, soy fiber readily releases moisture upon release of pressure at the die exit temperature. Flashing of the moisture released contributes to expansion, i.e., "puffing," of the extrudate, thus conducing to the formation of the low density extrudate of the invention.

Referring now to FIG. 1, in the above noted embodiment, a suitable extrusion process comprises introducing the particular ingredients of the soy protein containing material formulation into a mixing tank 101 (i.e., an ingredient blender) to combine the ingredients and form a protein pre-mix. The pre-mix is then transferred to a hopper 103 where the pre-mix is held for proteining via screw proteiner 105 to a pre-conditioner 107 to form a conditioned protein mixture. The conditioned protein mixture is then fed to an extrusion apparatus (i.e., extruder) 109 in which the protein mixture is heated under mechanical pressure generated by the screws of the extruder to form a molten extrusion mass. The molten extrusion mass exits the extruder through an extrusion die.

In pre-conditioner 107, the particulate solid ingredient mix is preheated, contacted with moisture, and held under controlled temperature and pressure conditions to allow the moisture to penetrate and soften the individual particles. The pre-conditioning step increases the bulk density of the particulate protein mixture and improves its flow characteristics. The preconditioner 107 contains one or more paddles to promote uniform mixing of the protein and transfer of the protein mixture through the preconditioner. The configuration and rotational speed of the paddles vary widely, depending on the capacity of the preconditioner, the extruder throughput and/or the desired residence time of the protein mixture in the pre-conditioner or extruder barrel. Generally, the speed of the paddles is from about 500 to about 1300 revolutions per minute (rpm).

Typically, the soy protein containing protein mixture is pre-conditioned prior to introduction into the extrusion apparatus 109 by contacting a pre-mix with moisture (i.e., steam and/or water) at a temperature of at least 45° C. (110° F. It has been observed, however, that higher temperatures (i.e., temperatures above 85° C. (185° F.)) in the preconditioner may encourage starches to gelatinize, which in turn may cause lumps to form, which may impede flow of the protein mixture from the preconditioner to the extruder barrel.

Typically, the pre-mix is conditioned for a period of about 30 to about 60 seconds, depending on the speed and the size of the conditioner. The pre-mix is contacted with steam and/or water and heated in the pre-conditioner 107 at generally constant steam flow to achieve the desired temperatures. The water and/or steam conditions (i.e., hydrates) the protein mixture, increases its density, and facilitates the flowability of the dried mix without interference prior to introduction to the extruder barrel where the proteins are texturized.

The conditioned pre-mix may contain from about 5% to about 25% (by weight) water. The conditioned pre-mix typically has a bulk density of from about 0.25 g/cm$^3$ to about 0.6 g/cm$^3$. Generally, as the bulk density of the pre-conditioned protein mixture increases within this range, the protein mixture is easier to process. This is presently believed to be due to such mixtures occupying all or a majority of the space between the screws of the extruder, thereby facilitating conveying the extrusion mass through the barrel.

The conditioned pre-mix is generally introduced to the extrusion apparatus 109 at a rate of no more than 10 kilograms (kg)/min (no more than 20 lbs/min). Generally, it has been observed that the density of the extrudate decreases as the protein rate of pre-mix to the extruder increases.

Extrusion devices have long been used in the manufacture of a wide variety of edible products. One suitable extrusion device is a double-barrel, twin screw extruder as described, for example, in U.S. Pat. No. 4,600,311. Examples of commercially available double-barrel, twin screw extrusion apparatus include a CLEXTRAL Model BC-72 extruder manufactured by Clextral, Inc. (Tampa, Fla.); a WENGER Model TX-57 extruder manufactured by Wenger (Sabetha, Kans.); and a WENGER Model TX-52 extruder manufactured by Wenger (Sabetha, Kans.). Other conventional extruders suitable for use in this invention are described, for example, in U.S. Pat. Nos. 4,763,569, 4,118,164, and 3,117,006, which are incorporated by reference.

The screws of a twin screw extruder can rotate within the barrel in the same or opposite directions. Rotation of the screws in the same direction is referred to as single flow whereas rotation of the screws in opposite directions is referred to as double flow.

The speed of the screw or screws of the extruder may vary depending on the particular apparatus. However, the screw speed is typically from about 250 to about 350 revolutions per minute (rpm). Generally, as the screw speed increases, the density of the extrudates decreases.

The extrusion apparatus 109 generally comprises a plurality of heating zones through which the protein mixture is conveyed under mechanical pressure prior to exiting the extrusion apparatus 109 through an extrusion die. The temperature in each successive heating zone generally exceeds the temperature of the previous heating zone by between about 10° C. and about 70° C. (between about 15° F. and about 125° F. In one embodiment, the conditioned pre-mix is transferred through four heating zones within the extrusion apparatus, with the protein mixture heated to a temperature of from about 100° C. to about 150° C. (from about 212° F. to about 302° F.) such that the molten extrusion mass enters the extrusion die at a temperature of from about 100° C. to about 150° C. (from about 212° F. to about 302° F.).

The pressure within the extruder barrel is not narrowly critical. Typically the extrusion mass is subjected to a pressure of at least 400 psig (about 28 bar) and generally the pressure within the last two heating zones is from about 1000 psig to about 3000 psig (from about 70 bar to about 210 bar). The barrel pressure is dependent on numerous factors including, for example, the extruder screw speed, feed rate of the mixture to the barrel, feed rate of water to the barrel, and the viscosity of the molten mass within the barrel.

Water is injected into the extruder barrel to hydrate the protein mixture and promote texturization of the proteins. As an aid in forming the molten extrusion mass the water may act as a plasticizing agent. Water may be introduced to the extruder barrel via one or more injection jets in communication with a heating zone. Typically, the mixture in the barrel contains from about 15% to about 30% by weight water. The rate of introduction of water to any of the heating zones is generally controlled to promote production of an extrudate having desired characteristics. It has been observed that as the rate of introduction of water to the barrel decreases, the density of the extrudate decreases. Typically, less than about 1 kg of water per kg of protein is introduced to the barrel. Generally, from about 0.1 kg to about 1 kg of water per kg of protein are introduced to the barrel.

Referring again to FIG. 1, the molten extrusion mass in extrusion apparatus 109 is extruded through a die (not shown) to produce an extrudate, which is then dried in dryer 111.

Extrusion conditions are generally such that the product emerging from the extruder barrel typically has a moisture content of from about 20% to about 45% (by weight). The moisture content is derived from water present in the mixture introduced to the extruder, moisture added during preconditioning and/or any water injected into the extruder barrel during processing.

Upon release of pressure, the molten extrusion mass exits the extruder barrel through the die, superheated water present in the mass flashes off as steam, causing simultaneous expansion (i.e., puffing) of the material. The level of expansion of the extrudate upon exiting of the mixture from the extruder in terms of the ratio of the cross-sectional area of extrudate to the cross-sectional area of die openings is generally less than 15:1. Typically, the ratio of the cross-sectional area of extrudate to the cross-sectional area of die openings is from about 2:1 to about 11:1.

The extrudate is cut after exiting the die. Suitable apparatus for cutting the extrudate include flexible knives manufactured by Wenger (Sabetha, Kans.) and Clextral (Tampa, Fla.).

The dryer 111 used to dry the extrudates generally comprises a plurality of drying zones in which the air temperature may vary. Generally, the temperature of the air within one or more of the zones will be from about 135° C. to about 185° C. (from about 280° F. to about 370° F. Typically, the extrudate is present in the dryer for a time sufficient to provide an extrudate having a desired moisture content. This desired moisture content may vary widely depending on the intended application of the extrudate and, typically, is from about 2.5% to about 5.0% by weight. Generally, the extrudate is dried for at least 5 minutes and, more generally, for at least 10 minutes. Suitable dryers include those manufactured by Wolverine Proctor & Schwartz (Merrimac, Mass.), National Drying Machinery Co. (Philadelphia, Pa.), Wenger (Sabetha, Kans.), Clextral (Tampa, Fla.), and Buehler (Lake Bluff, Ill.).

The extrudates, which are suitable for use as the textured soy protein product as described herein, may further be comminuted to reduce the average particle size of the extrudate. Suitable grinding apparatus include hammer mills such as Mikro Hammer Mills manufactured by Hosokawa Micron Ltd. (England).

One specific example of a suitable textured soy protein product for use in the snack products described herein is FXP MO339, available from The Solae Co. (St. Louis, Mo.). FXP MO339 is an extruded dry textured soy protein product with suitable fibrosity and texture, and a suitable amount of soy protein. It provides flexibility and versatility in a variety of meat free or supplemented meat foods. Specifically, FXP MO339 comprises about 70% (by weight) protein (about 66% (by weight of total protein) soy protein isolate and about 34% (by weight of total protein) wheat gluten), about 10% (by weight) water, about 14% (by weight) carbohydrate, about 3% (by weight) fat, and about 3% (by weight) ash. The exact amount of each component may vary slightly from batch to batch. Another suitable textured soy protein product for use in the snack products described herein is VETEX 1000, available from Stentorian Industries Company Limited (Taiwan).

As noted previously herein, textured soy protein products provide for a product having high protein and soluble fiber. These textured soy protein products impart a chewy, firm, or fibrous texture to the end product. Generally, these textured soy protein products are used to simulate and enhance the texture in meat products.

The amount of textured soy protein product in the high protein snack product of the present invention varies depending upon the type of flavoring agent present in the high protein snack product. For example, when the flavoring agent is a fruit flavor flavoring agent, the high protein snack product suitably comprises at least 45% (by weight) of a textured soy protein product. More suitably, when the flavoring agent is a fruit flavor flavoring agent, the snack product comprises at least 50% (by weight) of a textured soy protein product. In some embodiments, when the flavoring agent is a fruit flavor flavoring agent, the snack product comprises at least 55% (by weight) of a textured soy protein product.

When the flavoring agent is a savory flavor flavoring agent, the snack product suitably comprises, at least 35% (by weight) of a textured soy protein product, more suitably, the snack product comprises at least 38% (by weight) of a textured soy protein product.

Suitable textured soy protein products for inclusion in the snack products of the present invention comprise at least 66% (by weight) total protein, suitably at least 70% (by weight) total protein, and more suitably at least 75% (by weight) total protein. The total protein in the textured soy protein product of the present invention is generally comprised of soy protein isolates and wheat gluten, although minor amounts of other proteins may also be present.

In order to impart the desired level of soy protein into the snack products described herein, it is generally desirable that of the total amount of protein contained in the textured soy protein product, at least 40% (by weight) of the total protein be soy protein. In another embodiment, at least 50% (by weight) of the total protein in the high protein snack product is soy protein, more suitably at least 66% (by weight) of the total protein is soy protein.

In addition to the soy protein, the protein in the high protein snack product is also comprised of wheat gluten, as noted above. Gluten is defined generally as a protein substance that remains when starch is removed from cereal grains, such as wheat, rye, and oat grains. Wheat gluten is gluten prepared from wheat. Wheat gluten provides for a chewy, elastic, or spongy texture in a finished food product, thereby imitating the texture of meat.

In addition to the soy protein and wheat gluten that comprise the total amount of protein, the textured soy protein product of the present invention generally comprises no more than 12% (by weight) water, no more than 6% (by weight) fat, no more than 15% (by weight) carbohydrate, and no more than 6% (by weight) ash. More suitably, the textured soy protein product comprises no more than 10% (by weight) water, no more than 5% (by weight) fat, no more than 14% (by weight) carbohydrate, and no more than 3% (by weight) ash.

As described in more detail below and in the Examples, the textured soy protein product is hydrated in water (and potentially various flavoring agents that are soluble in water) as a first step in preparing the snack products described herein. In order to allow sufficient hydration for use in the products described herein, the textured soy protein product suitably has a hydration ratio of water to soy protein product of from about 1.5 to about 6.0, or more suitably from about 1.5 to about 3.0. As used herein, the term "hydration ratio" means the amount of water required to fully wet or hydrate the textured soy protein product such that it swells and can be easily shredded into fibers by further processing. If the hydration ratio is too low; that is, if not enough water is present, the textured soy protein product will not be fully swollen or hydrated and will not shred properly as it will contain dry fibers or spaces. If the hydration ratio is too high; that is, too much water is present, drying of the product will be problematic and the textured soy protein product may have reduced integrity.

In addition to the textured soy protein product, the high protein snack products of the present invention comprise a flavoring agent to impart a pleasant flavor to the end product. The term "flavoring agent" as used herein refers to an organoleptic agent in the form of an emulsion, concentrate, aqueous- or oil-soluble liquid, dry powder, or a combination thereof. The flavoring agents can be, for example, a fruit flavor or savory flavor flavoring agent. Suitably, flavor mixes, such as KOOL-AID flavor mixes, can be used as fruit flavor flavoring agents. The flavor mixes generally comprise citric acid, maltodextrin, salt, natural and artificial flavors, ascorbic acid, calcium phosphate, and coloring agents. The flavoring agents further enhance the taste of the high protein snack product. Suitable flavoring agents can be any natural or artificial flavoring agents.

The flavoring agents may include, but are not limited to, fruit flavor flavoring agents and savory flavor flavoring agents, as noted above. Suitable fruit flavor flavoring agents may include orange, lemon lime, grape, wild watermelon kiwi, cherry, pink lemonade, berry blue, strawberry, apple, plum, raisin, banana, pear, peach, figs, dates, and the like, and combinations thereof.

As used herein, the term "savory flavor" means having a non-sweet flavor as a characterizing flavor, which may be, for example, aromatic or spicy in taste. Suitable savory flavor flavoring agents for inclusion in the snack products discussed herein may include ranch, italian, pizza, barbecue, smoke, teriyaki, pepper, vinegar, nacho seasoning, sour cream and onion seasoning, sweet and sour seasoning, hot seasoning, spicy seasoning, chicken flavor seasoning, and the like, and combinations thereof.

In addition to the above flavoring agents, the high protein snack product may further comprise an acidulent. The term "acidulent" as used herein refers to a food ingredient, usually an acid, which causes the resulting food product to taste sour, tart, or acidic. Further the acidulent can impart an antioxidant function to the high protein snack product, which keeps the product from turning rancid during shipment and/or during storage. Acidulents for use as additives in food products are well known in the art. For example, suitable acidulents for the high protein snack product include citric acid and ascorbic acid alone or in combination.

Additionally, the high protein snack product may further comprise a sweetener, sometimes referred to in the art as a sweetening agent. Sweeteners are well known in the food product art. Suitable sweeteners include various sugars and sugar products such as, for example, sucrose, dextrose, maltose, fructose, lactose, corn syrup, honey, molasses, and combinations thereof. Sweeteners enhance taste by imparting sweetness to the high protein snack product. The sweeteners may also provide the high protein snack product with an enhanced chewy texture, which may be desirable in some embodiments. Specifically, as the amount of sweetener in the high protein snack product is increased, the texture generally becomes increasingly chewy. In addition, the sweeteners tend to bind free water located in the product, and thereby reduce the water activity of the high protein snack product. This reduction of water activity in the high protein snack product is important as discussed below.

In addition to the components mentioned above, the high protein snack product can comprise salt. Similar to the acidulents and sweeteners, salts can enhance the flavor of the finished high protein snack product. Additionally, like sugars, salts bind water, further reducing water activity in the high protein snack product.

The high protein snack product may also comprise a binding agent in some embodiments. The term "binding agent" as used herein means an agent that contributes to the uniformity or consistency of a product under a variety of conditions encountered during processing, storage, or use. Additionally, binding agents can enhance texture and bite. Binding agents may also be referred to in the art as bulking agents, thickeners, or gelling agents. Suitable binding agents for use in the high protein snack product include methylcellulose, available as METHOCEL from Dow Chemical Co. (Midland, Mich.), egg whites, cereal proteins, vegetable fibers, and combinations thereof. A preferred binding agent is METHOCEL, which contains hydroxypropyl methylcellulose.

As noted above, the high protein snack product described herein preferably has low water activity to prevent the growth of microorganisms within the product and allow for a shelf stable product. The term "water activity" as used herein means the amount of unbound, free water in a material that is available to support biological and chemical reactions. Specifically, the water activity of the high protein snack product is a measure of how much bacterial growth and enzymatic activity the snack product is likely to support. The water activity of a food is measured as the partial pressure of water in the food divided by the saturation pressure of water at the same temperature. All microorganisms have defined growth limits, that is, a specific level of water activity, in which cells of a microorganism dehydrate and can no longer support growth. For example, pathogenic bacteria in food can be inhibited by water activity of less than 0.92, and desirably less than 0.85. Specifically, an important microorganism, Clostridium botulinium, is growth-inhibited when the water activity is less than 0.95. Yeasts and molds are more resistant to the dehydrating effect, and thus, it is necessary to lower activity to as little as 0.85 or lower to completely inhibit growth.

Water activity can be measured using a chilled-mirror dew point technique. According to this technique, a sample of the snack product is placed in a cup of limited headspace at room temperature. The cup is inserted into a sample chamber in an analytical instrument, preferably an AquaLab CX2, available from Decagon Devices, Inc. (Pullman, Wash.), which equilibrates the vaporization of moisture from the sample onto a mirror in the chamber by repeatedly heating and cooling the sample in the sample chamber. The instrument measures the temperature and water activity each time dew forms on the mirror. When the water activity readings deviate by less than 0.001, a final water activity is determined. Another suitable analytical instrument for measuring water activity is an AquaLab® Model Series 3TE, also available from Decagon Devices, Inc. (Pullman, Wash.).

Suitably, in the present invention, the high protein snack product has a water activity level of less than 0.85. In some embodiments, the high protein snack product has a water activity level of less than 0.82, or even less than 0.80.

In addition to the high protein snack products, the present invention is also directed to processes for preparing these high protein snack products. In one embodiment, the process comprises a number of steps including: (1) hydrating a textured soy protein product comprising at least 66% (by weight) protein by contacting the textured soy protein product with a hydrating solution; (2) shredding the hydrated textured soy protein product; (3) mixing the shredded hydrated textured soy protein product with a solution comprising a binding agent and water to form a cohesive product mixture; (4) forming the cohesive product mixture into a log or loaf; (5) crust freezing the cohesive product mixture; (6) dividing the frozen cohesive product mixture into a plurality of individual wafers; and (7) drying the individual wafers such that the wafers have a water activity of less than 0.85.

As noted above, the textured soy protein product is hydrated by being contacted with a hydrating solution. As used herein, the term "hydrating" refers to a static or dynamic soaking of the textured soy protein product to introduce water therein. Generally, the textured soy protein product is contacted with the hydrating solution until the hydrating solution is uniformly absorbed throughout the textured soy protein product. More specifically, after hydrating is completed, the textured soy protein product will typically have no visible dry spots. Suitably, the textured soy protein product is contacted with the hydrating solution for a time period of from about 20 minutes to about 1 hour. Static soaking is typically preferred to preserve the integrity of the raw material, although the soaking can be done with turbulence to increase the water uptake rate.

Suitably, hydration occurs by contacting the textured soy protein product with a sufficient amount of a hydrating solution comprising water. As noted above, in order to allow sufficient hydration, the textured soy protein product suitably has a hydration ratio of water to the soy protein product of from about 1.5:1 to about 3.0:1. If less water is used, the textured soy protein product may not be sufficiently hydrated for subsequent processing steps. If more water is used, the cost of manufacturing may increase as excess water may have to be removed from the product. In some embodiments, the hydrating solution may also include other water soluble components, such as, for example, flavoring agents, sugars, acidulents, and salts. Some of these optional components enhance the flavor and lower the water activity of the finished high protein snack product.

After the textured soy protein product has been sufficiently hydrated, it is shredded. The shredding step tears the hydrated textured soy protein product into pieces. This step forms fibers of the textured soy protein product, resembling, for example, shredded chicken. Suitably, the shredding step can be performed using a mixer. For example, a KITCHEN AID mixer with a paddle can suitably be used for small batches (i.e., about 500 g of hydrated textured soy protein product). Another suitable mixer is a Hobart mixer, which can be used for larger batches (i.e., about 2 kg to about 5 kg).

In some embodiments where the flavoring agent is not solubilized in the hydrating solution, the flavoring agent, such as a savory or fruit flavor flavoring agent, may be added during shredding or after the hydrated textured soy protein product is sufficiently shredded. In some embodiments, a powdered or liquid flavor agent is added after shredding.

Once the shredding is complete, the shredded hydrated textured soy protein product is typically mixed with a solution to form a cohesive product mixture. Mixing should be at a slow speed to allow for even distribution of the solution into the shredded hydrated textured soy protein product. The solution may comprise a binding agent, such as methylcellulose, water, and other seasonings or flavoring agents to form a cohesive product mixture that can be easily formed and frozen. Specifically, the solution can be only water, water added simultaneously with the other components, or a combination thereof. These components may also be added directly to the shredded hydrated textured soy protein product. A loaf or log is typically formed from the resulting mixture. As will be recognized by one skilled in the art, if a non-structured product is desired for processing, the binding agent may not be used. Both restructured and non-restructured products are within the scope of the present invention.

After the cohesive mixture has been formed, it is generally crust frozen to allow for easy processing. The term "crust freezing" or "crust frozen", as used herein, refers to freezing the surface or crust of the cohesive product mixture such that the outer surface becomes rigid and frozen. Generally, the middle portion is not frozen solid, but is cooled for easy slicing. Generally, the cohesive product mixture is placed into a freezer having a temperature of, for example, −21° C. (−5° F.) for a time period of from about 45 minutes to about 1 hour to facilitate freezing. This results in a cohesive product mixture having a surface temperature of about −1° C. (30° F.), while having a core temperature of about 1.67° C. (35° F.).

After the crust freezing, the formed mixture is cut or divided into a plurality of individual slices or wafers. Suitably, the cohesive product mixture is sliced using a meat slicer into individual wafers being from about 0.5 millimeters to about 4 millimeters thick, preferably from about 1 millimeter to about 3 millimeters thick.

Optionally, the process of the present invention can comprise introducing the cohesive product mixture into a casing material prior to crust freezing the cohesive product mixture. The casing material enables improved handling and slicing of the individual wafers. Suitably, the casing material is an impermeable material such as a clear or opaque polyvinyldenechloride (PVDC) tube having a diameter of about 30 millimeters or so. The casing material is then generally sealed to enclose the mixture therein.

Finally, to produce the snack products described herein, the individual wafers are dried. For high protein snack products with a semi-chewy texture, it is suitable to dry the individual wafers in a pre-heated convection oven at a temperature of from about 50° C. (131° F.) to about 90° C. (194° F.). Suitably the drying time of the individual wafers will be from about 15 to about 35 minutes. The individual wafers are generally dried to a yield of from about 40% to about 60%, more suitably from about 50% to about 55%. The end point for drying is generally dictated by the desired water activity of the end product as described above. As one skilled in the art will recognize based on the disclosure herein, different drying times and temperatures can be used without departing from the scope of the present invention.

For a high protein snack product with a crisp texture as opposed to a chewy texture, it is suitable to dry the individual wafers in a pre-heated convection oven at a higher temperature and/or for a longer time period. For example, the temperature of the pre-heated convection oven can be from about 100° C. (212° F.) to about 200° C. (392° F.). The drying time of the individual wafers suitably ranges from about 30 to about 45 minutes. The individual wafers are dried to a yield of from about 35% to about 50% and generally have a relatively low water activity.

In another embodiment, the dried individual wafers can be additionally dehydrated or deep fat fried to produce a crispier end product. For example, the dried individual wafers can be deep fat fried at a temperature of from about 145° C. (293° F.) to about 180° C. (356° F.) or so to produce a crispy product. During the deep fat frying process, the majority of free-water in the wafers will be replaced with oil. It is desirable to minimize this oil uptake, as this will lead to a healthier, low fat snack product. As such, the frying time of the individual wafers is generally short, suitably from about 1 to about 30 seconds.

Another suitable method for producing a crisp snack product includes using a microwave oven or other oven to dehydrate the previously dried wafers. Suitably, the individual wafers are microwaved at from about 1000 Watts to about 1200 Watts for a time of from about 15 to about 30 seconds to produce a crisp wafer.

As a result of the above processes, the individual wafers will have a water activity level of less than 0.85. In some embodiments, the individual wafers will have a water activity of less than 0.82, or even 0.80 or less. At these water activity levels, the resulting snack products are substantially shelf stable. As will be recognized by one skilled in the art based on the disclosure herein, the water activity of the wafers that are deep fat fried or microwaved after initial drying will typically be less than that of wafers dried to a chewy texture.

The above embodiments result in a high protein snack product having an acceptable taste and texture. In one embodiment, the high protein snack product suitably comprises from about 35% (by weight) to about 60% (by weight) of a textured soy protein product, from about 2% (by weight) to about 4% (by weight) of a fruit flavor flavoring agent, from about 2.5% (by weight) to about 3.5% (by weight) methylcellulose, and from about 1% (by weight) to about 14% (by weight) water. As noted above, the high protein snack product can optionally include sugars and salts. Typically, sugars such as sucrose and dextrose are present in the snack product in an amount of from about 0% (by weight) to about 35% (by weight). The salts are typically present in the snack product in an amount of from about 2% (by weight) to about 3% (by weight).

In another embodiment, the resulting high protein snack product has a savory flavor. The high protein snack product suitably comprises from about 35% (by weight) to about 60% (by weight) of a textured soy protein product, from about 15% (by weight) to about 30% (by weight) of a savory flavor flavoring agent, from about 2% (by weight) to about 3.5% (by weight) methylcellulose, and from about 1% (by weight) to about 20% (by weight) water. The high protein snack product can optionally include sugars and salts. Typically, sugars such as sucrose and dextrose are present in the snack product in an amount of from about 0% (by weight) to about 35% (by weight). The salts are typically present in the snack product in an amount of from about 2% (by weight) to about 3% (by weight).

EXAMPLES

The following examples are simply intended to further illustrate and explain the present invention. The invention, therefore, should not be limited to any of the details in these examples.

Example 1

In this example a chewy, orange-flavored high protein snack product based on a textured soy protein product is prepared.

The high protein snack product is prepared by first dissolving an orange flavor mix (6.6 grams, commercially available from KOOL-AID and containing citric acid, maltodextrin, salt, natural and artificial flavors, ascorbic acid, calcium phosphate, and coloring agents), sucrose (30 grams), dextrose (30 grams) and salt (1 gram) in water (160 grams) to form a flavored hydrating solution. The hydrating solution (227.6 grams) is then contacted with FXP M0339 (The Solae Company, St. Louis, Mo.) (100 grams), which is a textured soy protein product, for a period of about 20 minutes to allow hydration of the FXP M0339. The textured soy protein product consistes of about 70% (by weight) protein (about 66% (by weight of total protein) soy protein and about 34% (by weight of total protein) wheat gluten), about 10% (by weight) water, about 14% (by weight) carbohydrate, about 4% (by weight) fat, and about 4% (by weight) ash.

After hydration, the hydrated textured soy protein product is shredded in a KITCHEN AID mixer with a paddle attachment to form fibers of the protein product. METHOCEL (Dow Chemical Company, Midland, Mich.) (6 grams) and water (30 grams) are added to the shredded, hydrated soy protein product while mixing at a slow speed to evenly distribute both the water and the METHOCEL throughout the shredded soy protein product. Once the METHOCEL and water are evenly distributed throughout the shredded soy protein product, the hydrated soy protein product is introduced into a clear, polyvinyldenechloride (PVDC) casing having a diameter of about 30 millimeters and sealed by tying the end. The encased mixture is then introduced into a freezer having a temperature of −21° C. (−5° F.), for about 45 minutes to crust freeze the encased mixture to form a formed product.

After about 45 minutes in the freezer, the encased mixture is removed and the formed product is sliced into 2-millimeter thick wafers using a meat slicer. The wafers are placed onto a perforated tray, which has been sprayed with baker's oil, commercially available as Professional Bak-klene from Cahokia Flour Co. (St. Louis, Mo.) and dried in a pre-heated convection oven at a temperature of 71° C. (160° F.) for approximately 24 minutes to a yield of 55% of the original weight. This resultes in a water activity in the wafer of less than 0.85.

After drying, the wafers have the composition as shown in Table 1.

TABLE 1

| Component | Weight % |
| --- | --- |
| Protein extrudate | 50.2 |
| Flavor mix | 2.8 |
| Salt | 0.5 |
| Dextrose | 15.1 |
| Sucrose | 15.1 |
| Methylcellulose | 3.0 |
| Water | 13.3 |

Other fruit flavor mixes are also produced using the above-described method including lemon lime, grape, wild watermelon kiwi, cherry, pink lemonade flavor, and berry blue.

Example 2

In this Example, crispy orange-flavored high protein snack products are produced. The snack product is prepared as described above in Example 1 with the exception that the sliced wafers are dried in a pre-heated convection oven at a temperature of 71° C. (160° F.) for 33 minutes to a yield of 48% of the weight of the wafers prior to drying. The dried wafer product has a water activity of less than 0.80.

After drying, the wafers have the composition as shown in Table 2.

TABLE 2

| Component | Weight % |
| --- | --- |
| Protein extrudate | 57.3% |
| Flavor Mix | 3.2% |
| Salt | 0.6% |
| Dextrose | 17.2% |
| Sucrose | 17.2% |
| Methylcellulose | 3.4% |
| Water | 1.1% |

Example 3

In this Example, barbecue-flavored high protein snack products based on a textured soy protein product are prepared.

A textured soy protein product as described in Example 1 (500 grams) is introduced into water (1000 grams) and vacuum packaged to hydrate the textured soy protein product. After 30 minutes, the hydrated protein product is removed from the vacuum packaging and is shredded in a Hobart mixer with a whisk attachment. During the shredding process, a mixture of barbecue sauce, honey, and other liquid and dry seasonings (total of 674 grams) and vegetable oil (75 grams) are added to the hydrated soy protein product. When the hydrated soy protein product is sufficiently shredded and the sauce/seasoning mix and oil is uniformly distributed, METHOCEL (Dow Chemical Company, Midland, Mich.) (27.5 grams) and water (165 grams) are added to the shredded soy protein product mixture. The mixture is then introduced into a polyvinyldenechloride casing (30 millimeter diameter) and the end tied. The encased mixture is then introduced into a freezer (−21° C., −5° F.) for about 45 minutes to crust freeze the mixture.

Once the crust freezing is complete, the casing is removed and the mixture is sliced into 3-millimeter thick wafers. The wafers are then dried for about 24 minutes at a temperature of about 104° C. (220° F.) on a perforated tray that has been sprayed with baker's oil (Professional Bak-klene). This drying resultes in a yield of about 36% of the original weight and a water activity of about 0.85. After drying, the wafers correspond to the composition set forth in Table 3.

TABLE 3

| Component | Weight (g) | Weight % |
| --- | --- | --- |
| Protein extrudate | 100 | 56.7% |
| Seasoning, concentrated | 46 | 26.1% |
| Honey | 10 | 5.7% |
| Methylcellulose | 5.5 | 3.1% |
| Vegetable oil | 15 | 8.5% |

Example 4

In this Example, barbecue flavored high protein snack products are prepared. Using the procedure set forth in Example 3, a crust frozen mixture is prepared, the casing removed, the mixture sliced into wafers, and the wafers dried in a conventional oven. The sliced dried wafers are then deep fat fried in a soybean oil for 1 to 10 seconds at 148° C. (300° F.) to produce a crisp barbecue-flavored high protein snack product. The water activity of the resulting product is less than 0.85.

Example 5

In this Example, chewy barbecue flavored high protein snack products ware prepared. Using the procedure set forth in Example 3, a crust frozen mixture is prepared, the casing removed, and the mixture sliced into wafers as set forth in Example 3. The sliced wafers are then dried as set forth in Example 3 to 53% of their original weight, which resultes in a water activity of less than 0.85.

Example 6

In this Example, ranch flavored high protein snack products are prepared. The textured soy protein product as described in Example 1 (700 grams) and water (1400 grams) are introduced into a plastic bag and vacuum packaged to hydrate the textured soy protein product. After thirty minutes, the hydrated soy protein product is shredded in a Hobart mixer using a whisk attachment. Ranch salad dressing mix, commercially available from Hidden Valley (224 grams) are added to the shredded hydrated soy protein product and well mixed. METHOCEL (Dow Chemical Company, Midland, Mich.) (32 grams) and water (160 grams) are added to the mixture and blended on low speed for one minute and then on fast speed for about 2 minutes to evenly distribute the METHOCEL and water throughout the shredded protein and salad dressing mix. The resulting mixture is introduced into a polyvinyldenechloride casing (diameter of 49 millimeters) and the end tied. The encased mixture is introduced into a freezer (−21° C., −5° F.) for one hour to crust freeze the encased mixture. After crust freezing, the casing is removed and the formed mixture is then sliced to 3-millimeter thick wafers. The wafers are placed on a perforated tray that has been sprayed with baker's oil (Professional Bak-klene), and dried in a convection oven at 177° C. (350° F.) for 30 minutes to a yield of about 50.7% of the original weight. The wafers are then deep fat fried in soybean oil for 1 to 15 seconds at 148° C. (300° F.) to obtain crisp products. The water activity of the resulting product is less than 0.85. After baking, the product corresponds to the composition in Table 4.

TABLE 4

| Component | Weight % |
| --- | --- |
| Protein extrudate | 54.3% |
| Water | 22.9% |
| Dextrose | 3.1% |
| Ranch seasoning powder | 17.2% |
| Methylcellulose | 2.5% |

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

The term "by weight" is used throughout the application to describe the amounts of components and protein content in the high protein snack product. Unless otherwise specified, the term "by weight" is intended to mean by weight on an as is basis, without any moisture added or removed from the product. The term by weight on a moisture-free basis is intended to mean on a dry basis, in which the moisture has been removed.

As various changes could be made in the above without departing from the scope of the invention, it is intended that all matter contained in the above description and shown in the accompanying drawings shall be interpreted as illustrative and not in a limiting sense.

What is claimed is:

1. A high protein snack product comprising a cohesive product mixture within a polyvinyldenechloride casing material, wherein the cohesive product mixture comprises from about 2.5% (by weight) up to about 3.5% (by weight) of a binding agent, from about 2% (by weight) up to about 3% (by weight) of a salt, up to about 35% (by weight) of a sweetener, from about 35% (by weight) up to about 60% (by weight) of a textured soy protein product, wherein the textured soy protein soy protein product is hydrated and shredded to form fibers and from about 2% (by weight) up to about 4% (by weight) of a fruity flavor flavoring agent, wherein the textured soy protein product comprises wheat gluten and a blend of soy protein isolates, wherein the blend of soy protein isolates comprises at least 2 parts by weight of a hydrolyzed soy protein isolate per part by weight of an unhydrolyzed soy protein isolate, and wherein the textured soy protein product comprises at least 75% (by weight) protein, wherein the protein in the textured soy protein product is at least 66% (by weight) soy protein.

2. A high protein snack product comprising a cohesive product mixture within a polyvinyldenechloride casing material, wherein the cohesive product mixture comprises from about 35% (by weight) up to about 60% (by weight) of a textured soy protein product, wherein the textured soy protein soy protein product is hydrated and shredded to form fibers, and from about 2% (by weight) up to about 4% (by weight) of a fruity flavor flavoring agent, wherein the textured soy protein product comprises wheat gluten and a blend of soy protein isolates, wherein the blend of soy protein isolates comprises at least 2 parts by weight of a hydrolyzed soy protein isolate per part by weight of an unhydrolyzed soy protein isolate, and wherein the textured soy protein product comprises at least 75% (by weight) protein, wherein the protein in the textured soy protein product is at least 66% (by weight) soy protein and wherein the high protein snack product is prepared by crust freezing and slicing a formulation that comprises from about 2.5% (by weight) up to about 3.5% (by weight) of a binding agent, from about 2% (by weight) up to about 3% (by weight) of a salt, up to about 35% (by weight) of a sweetener, water, the fruit flavor flavoring agent, and the hydrated textured soy protein product.

3. The high protein snack product as set forth in claim 1 wherein the textured soy protein product additionally comprises no more than 12% (by weight) water, no more than about 6% (by weight) fat, no more than about 15% (by weight) carbohydrate, and no more than about 6% (by weight) ash.

4. The high protein snack product as set forth in claim 1 wherein the textured soy protein product additionally comprises no more than 10% (by weight) water, no more than 5% (by weight) fat, no more than 14% (by weight) carbohydrate, and no more than 3% (by weight) ash.

5. The high protein snack product as set forth in claim 1 wherein the fruit flavor flavoring agent is selected from the group consisting of orange, lemon lime, grape, wild watermelon kiwi, cherry, pink lemonade, berry blue, strawberry, apple, plum, raisin, banana, pear, peach, figs, dates, and combinations thereof.

6. The high protein snack product as set forth in claim 1 wherein the high protein snack product has a water activity of less than 0.85.

7. The high protein snack product as set forth in claim 1 wherein the high protein snack product has a water activity of less than 0.82.

8. The high protein snack product as set forth in claim 1 wherein the textured soy protein product has a hydration ratio of from about 1.5 to about 3.0.

9. The high protein snack product as set forth in claim 2 wherein the formulation is introduced into a casing prior to crust freezing.

10. The high protein snack product as set forth in claim 2 wherein the formulation is dried after crust freezing to achieve a water activity of less than 0.85.

11. The high protein snack product as set forth in claim 2 wherein the formulation is dried after crust freezing to achieve a water activity of less than 0.82.

12. The high protein snack product as set forth in claim 10 wherein the drying is done in a convection oven.

* * * * *